US012288934B2

(12) United States Patent
Urtz

(10) Patent No.: US 12,288,934 B2
(45) Date of Patent: Apr. 29, 2025

(54) QUARTER TURN TRANSITION CLIP FOR RF CABLE INSTALLATION IN AN ANTENNA

(71) Applicant: John Mezzalingua Associates, LLC, Liverpool, NY (US)

(72) Inventor: Thomas Urtz, North Syracuse, NY (US)

(73) Assignee: John Mezzalingua Associates, LLC, Liverpool, NY (US)

( * ) Notice: Subject to any disclaimer, the term of this patent is extended or adjusted under 35 U.S.C. 154(b) by 133 days.

(21) Appl. No.: 18/120,603

(22) Filed: Mar. 13, 2023

(65) Prior Publication Data

US 2023/0335915 A1 Oct. 19, 2023

Related U.S. Application Data

(60) Provisional application No. 63/330,374, filed on Apr. 13, 2022.

(51) Int. Cl.

*H01Q 21/00* (2006.01)
*H01Q 21/06* (2006.01)

(52) U.S. Cl.

CPC ..... *H01Q 21/0006* (2013.01); *H01Q 21/0087* (2013.01); *H01Q 21/062* (2013.01)

(58) Field of Classification Search

CPC ........... H01Q 21/0006; H01Q 21/0087; H01Q 21/062; H01Q 21/0075; H01Q 1/246; H01Q 1/50; H01Q 1/48; H01R 9/0515; H01P 5/085

See application file for complete search history.

(56) References Cited

U.S. PATENT DOCUMENTS

| | | | | |
|---|---|---|---|---|
| 5,437,562 A * | 8/1995 | Michael | ............... | H01R 9/0515 439/63 |
| 8,932,078 B1 | 1/2015 | Martin et al. | | |

FOREIGN PATENT DOCUMENTS

| | | |
|---|---|---|
| CN | 113904129 A | 1/2022 |
| JP | 2011046331 A | 3/2011 |
| JP | 2013045741 A | 3/2013 |
| KR | 2020110004578 U | 5/2011 |

OTHER PUBLICATIONS

International Searching Authority; International Search Report and Written Opinion; International Application No. PCT/US2023/015081; Date of Mailing: Jun. 27, 2023; 9 pages.

* cited by examiner

*Primary Examiner* — David E Lotter
(74) *Attorney, Agent, or Firm* — Barclay Damon LLP

(57) ABSTRACT

An antenna has a plurality of dipoles disposed on a reflector plate. Mounted to the reflector plate is a PCB (Printed Circuit Board) having a plurality of keyed slots, one per radiator of the plurality of dipoles. Disposed within each keyed slot is a transition clip holding an RF (Radio Frequency) cable in place. The transition clip has a shape that holds it in place with a quarter turn, obviating the need to solder the transition clip in place before installing the RF cable. The transition clip is configured to mechanically and electrically couple to the outer conductor of the RF cable and holds in place during soldering. The transition clip and PCB are configured so that the steps of soldering the outer conductor to the transition clip and the inner conductor to an RF signal solder point on the PCB may be performed from the same side of the PCB.

11 Claims, 12 Drawing Sheets

QUARTER TURN TRANSITION CLIP FOR RF CABLE INSTALLATION IN AN ANTENNA

CROSS REFERENCE TO RELATED APPLICATION

This application claims priority to U.S. Ser. No. 63/330,374, entitled QUARTER TURN TRANSITION CLIP FOR RF CABLE INSTALLATION IN AN ANTENNA, filed Apr. 13, 2022 under relevant portions of 35 U.S.C. § 119 and 37 CFR §§ 1.51, 1.53. The entire contents of this application are incorporated herein by reference.

BACKGROUND OF THE INVENTION

Technical Field

The present invention relates to wireless communications, and more particularly, to devices internal to an antenna, such as antennas that are purposed for cellular communication, which connect cables, such as RF (Radio Frequency) cables to PCBs (Printed Circuit Boards).

Related Art

Cellular antennas generally have one or more arrays of radiators coupled to a PCB. The PCB has a plurality of transition points at which an RF cable is mounted to the PCB where it mechanically and electrically couples to a solder pad, which in turn electrically couples to the circuitry for one or more corresponding radiators. The mounting of the RF cable to the solder pad is typically facilitated by a transition clip. Conventional transition clips have an upper structure that facilitates mounting and soldering of the RF cable, and a lower structure that is inserted into a slot in the PCB and then soldered into place.

Conventional transition clips suffer from certain deficiencies. First, mounting the transition clip to the PCB requires that the transition clip be held in place while being soldered, and the soldering must be done from an underside of the PCB, which is opposite to the side at which the RF cable is soldered. Second, installing the RF cable onto the transition clip must be done in a second separate step, in which the inner and outer conductors of the RF cable are soldered to the transition clip from an upper side of the PCB. Installing the RF cable onto the transition clip requires additional soldering steps, potentially subjecting the pre-existing solder joint holding the transition clip to the PCB to reflow, which may undermine the solder joint. Further and according to this conventional procedure, a technician must have access to both the upper and lower sides of the PCB in order to perform the soldering steps.

SUMMARY OF THE DISCLOSURE

According to one aspect of the present disclosure there is provided an antenna. The antenna comprises a PCB (Printed Circuit Board) having a plurality of keyed slots, each of the keyed slots having a rectangular area, a circular area superimposed over the rectangular area. The antenna further comprises a plurality of transition clips, each transition clip being disposed within a corresponding keyed slot of the PCB, in which each transition clip has an upper tab, a lower tab, a PCB slot disposed between the upper tab and the lower tab, and two cable retainer walls that define a clip aperture. The antenna further comprises a plurality of RF cables, each of the RF cables being mechanically coupled to a corresponding transition clip. Each RF cable includes an exposed outer conductor that is mechanically and electrically coupled to a corresponding clip aperture by a first solder joint, and an inner conductor that is electrically and mechanically coupled to an RF signal solder point on the PCB by a second solder joint, wherein the first solder joint and the second solder joint are disposed on a same side of the PCB.

According to another aspect of the present disclosure there is provided a method for installing an RF (Radio Frequency) cable onto a PCB (Printed Circuit Board) within an antenna. The method comprises inserting a transition clip into a keyed slot disposed on the PCB, the PCB having a ground solder pad and an RF signal solder point. The method further comprises turning the transition clip so that the transition clip mechanically couples with the keyed slot and remains fixed within the keyed slot, the transition clip having a clip aperture. The method further comprises inserting a prepared RF cable into the clip aperture such that an exposed outer conductor of the RF cable is mechanically and electrically coupled to the clip aperture, soldering the exposed outer conductor to the transition clip, soldering the transition clip to the ground solder pad, and soldering an inner conductor of the RF cable to the RF signal solder point.

These and other features will be readily apparent from the accompanying drawings and Detailed Description which follow.

BRIEF DESCRIPTION OF THE DRAWINGS

So that the manner in which the features of the invention can be understood, a Detailed Description may be had by reference to certain embodiments, some of which are illustrated in the accompanying drawings. It is to be noted, however, that the drawings illustrate only certain embodiments and are therefore not to be considered limiting of its scope, for the scope of the disclosed subject matter encompasses other embodiments as well. The drawings are not necessarily to scale, emphasis generally being placed upon illustrating the features of certain embodiments. In the drawings, like numerals are used to indicate like parts throughout the various views.

DESCRIPTION OF EXEMPLARY EMBODIMENTS

The following Description should be read with reference to the drawings, in which like elements in different drawings are identically numbered. The drawings, which are not necessarily to scale, depict selected embodiments and are not intended to limit the scope of the invention. The Description illustrates by way of example, not by way of limitation, the principles of the invention. This Description will clearly enable one skilled in the art to make and use the invention.

As used herein, the terms "about" or "approximately" for any numerical values or ranges indicate a suitable dimensional tolerance that allows the part or collection of components to function for its intended purpose as described herein.

Figure 1A:
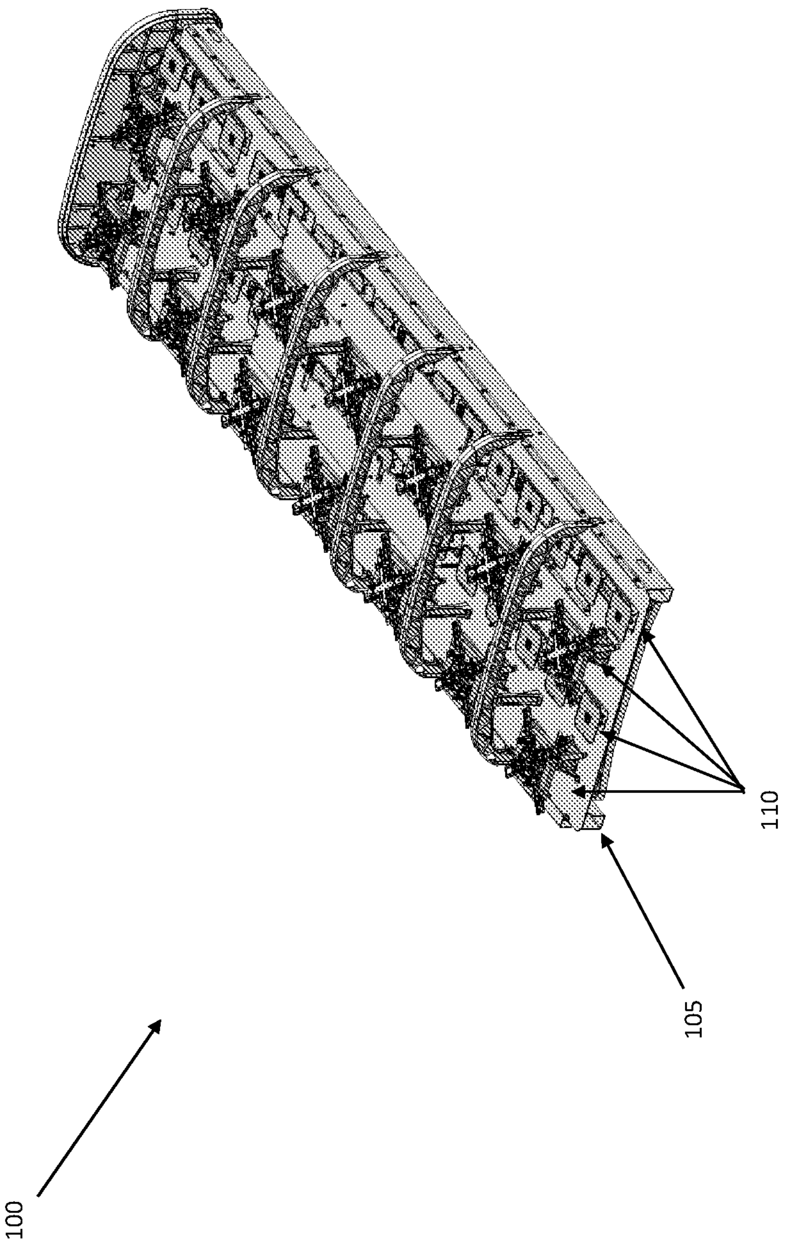
FIG. 1A illustrates an exemplary cellular antenna with the radome removed.

FIG. 1A illustrates an exemplary cellular antenna 100 with the radome removed. As illustrated, the cellular antenna 100 has a reflector plate 105 on which are disposed a plurality of dipoles 110. Each of the dipoles 110 may have two radiators, one radiator per polarization (e.g., +/−45 degrees). Accordingly, each of the dipoles 110 are fed two RF (Radio Frequency) signals that must be relayed from an antenna port (not shown) to a PCB (Printed Circuit Board) (not shown) that carries the RF signals to the dipoles 110 via RF cables (not shown).

Figure 1B:
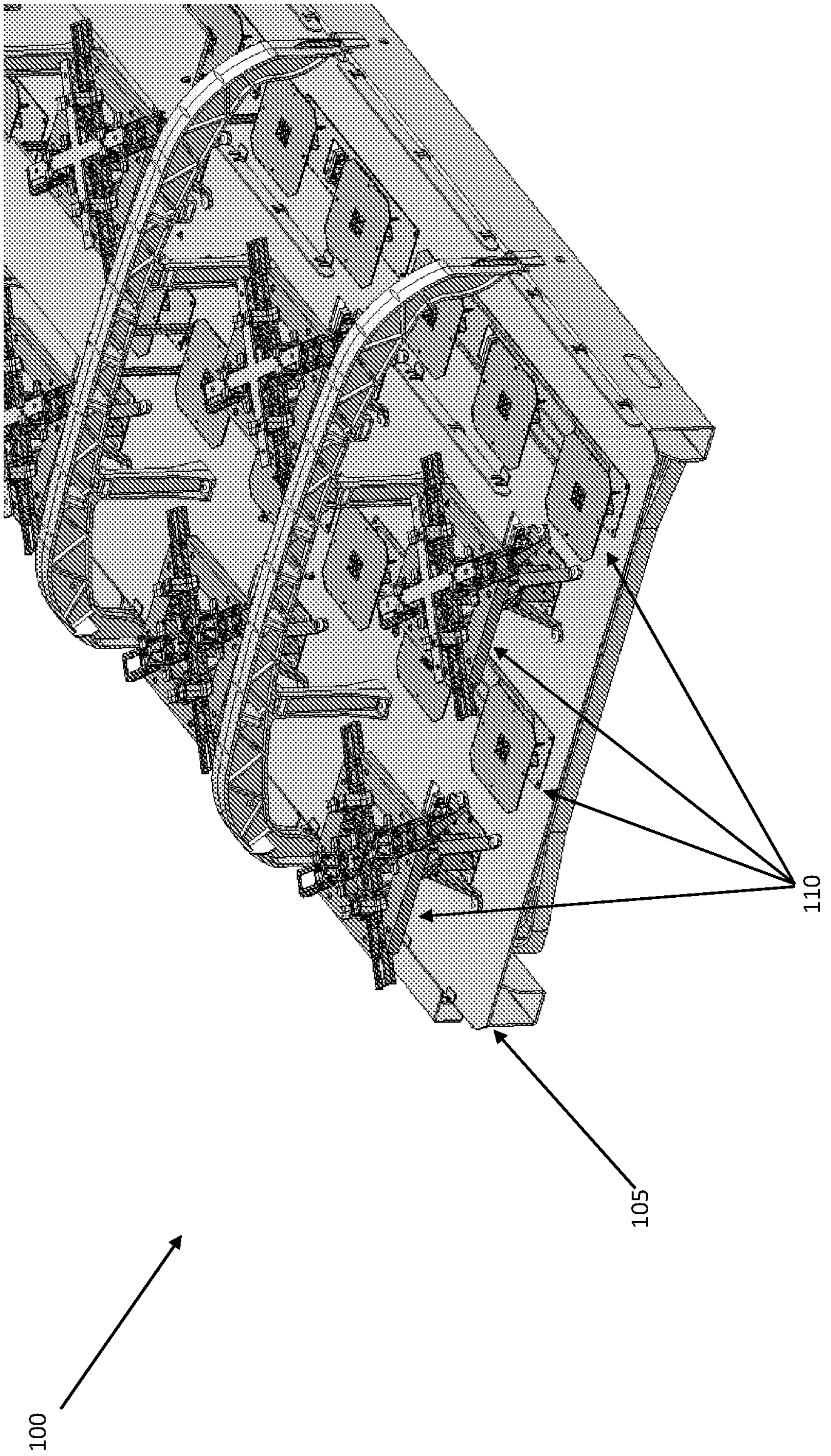
FIG. 1B is an enlarged view of a portion of the cellular antenna of FIG. 1A, showing a plurality of radiators of different frequency bands mounted on a reflector plate, along with the PCBs (Printed Circuit Boards) that provide signals to the radiators.

FIG. 1B is an enlarged view of a portion of the cellular antenna 100, showing dipoles 110 in different frequency bands mounted on reflector plate 105, along with the PCBs that provide signals to the dipoles 110.

Figure 1C:
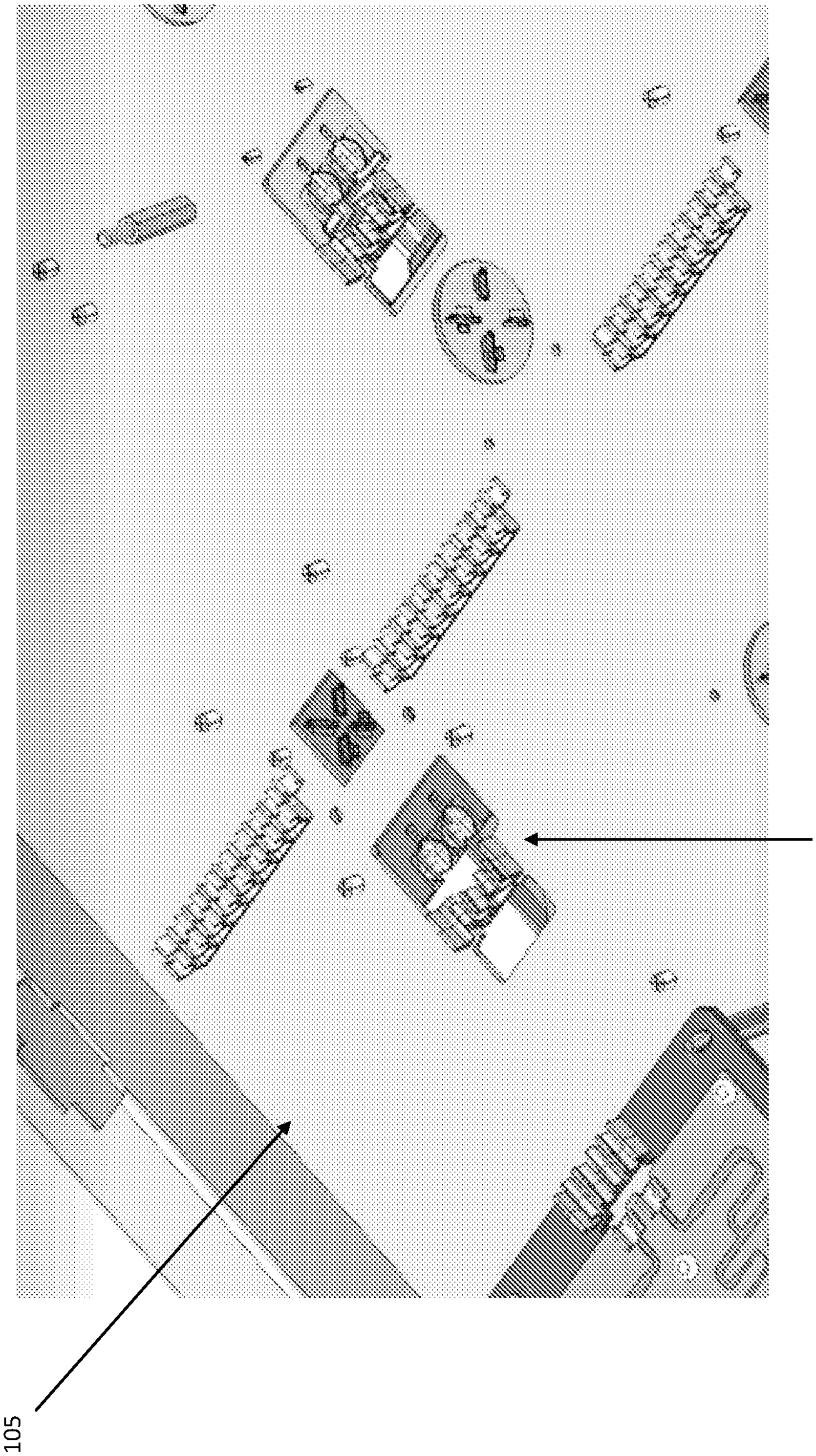
FIG. 1C illustrates an underside of the reflector plate of FIG. 1B, showing a plurality of RF (Radio Frequency) connection points, each of which having two RF connections with corresponding exemplary transition clips according to aspects of the disclosure.

FIG. 1C illustrates an underside of the reflector plate 105, showing a plurality of RF connection points 115. According to this exemplary embodiment, each of the RF connection points 115 have two (2) RF connections with corresponding exemplary transition clips according to aspects of the disclosure. Details relating to the transition clips are provided in a later portion of this document.

Figure 2:
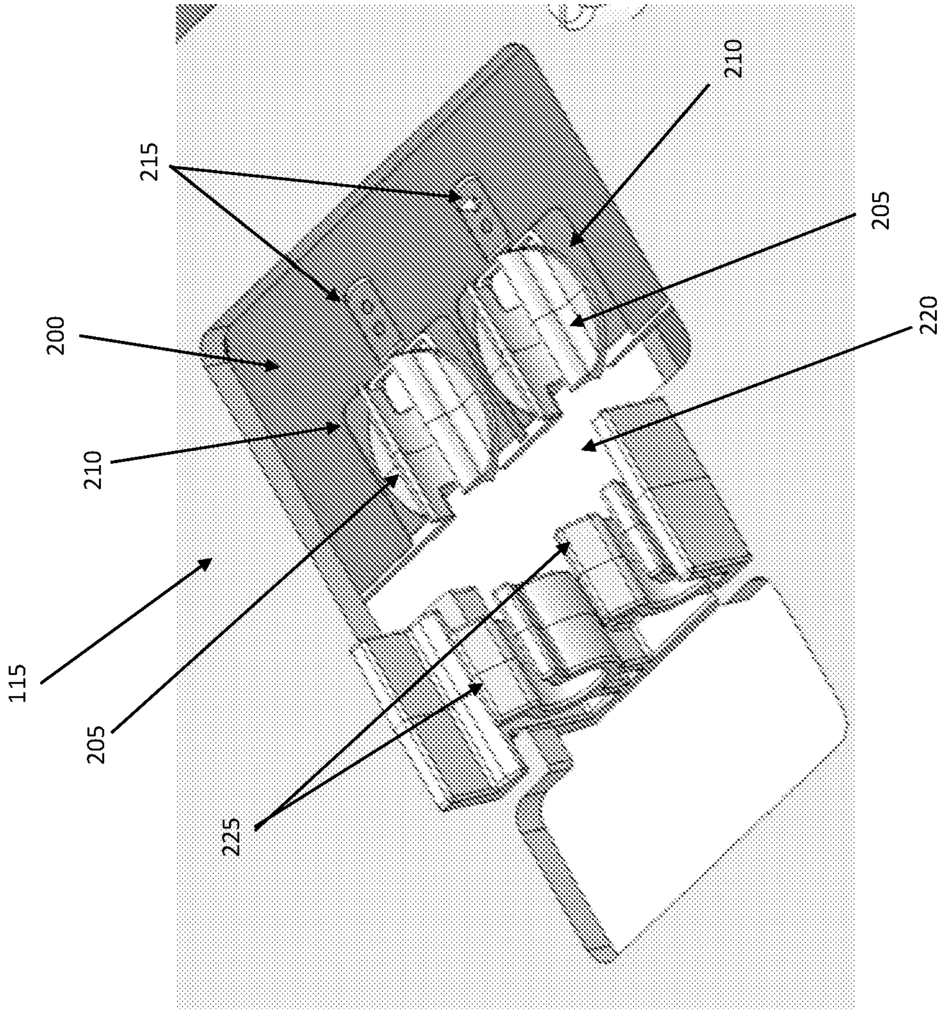
FIG. 2 illustrates a PCB (Printed Circuit Board) having two exemplary transition clips with no RF cables attached.

FIG. 2 illustrates an exemplary RF connection point 115, which includes a PCB 200 having two exemplary transition clips 205, and two cable retention clips according to aspects of the disclosure. As illustrated, no RF cables are installed. The PCB 200 according to this particular embodiment has two ground pads 210 as well as two RF signal solder points 215. As illustrated, the RF connection point 115, along with the PCB 200 and transition clips 205, are designed such that all soldering may be done from the underside of the reflector plate 105. The transition clips 205 are shown as having been installed and rotated so that each transition clip is stably situated in the PCB 200 and ready for installation of an RF cable (not shown). An exemplary method and apparatus for installing one of more transition clips 205 into PCB 200 is described further below.

Figure 3:
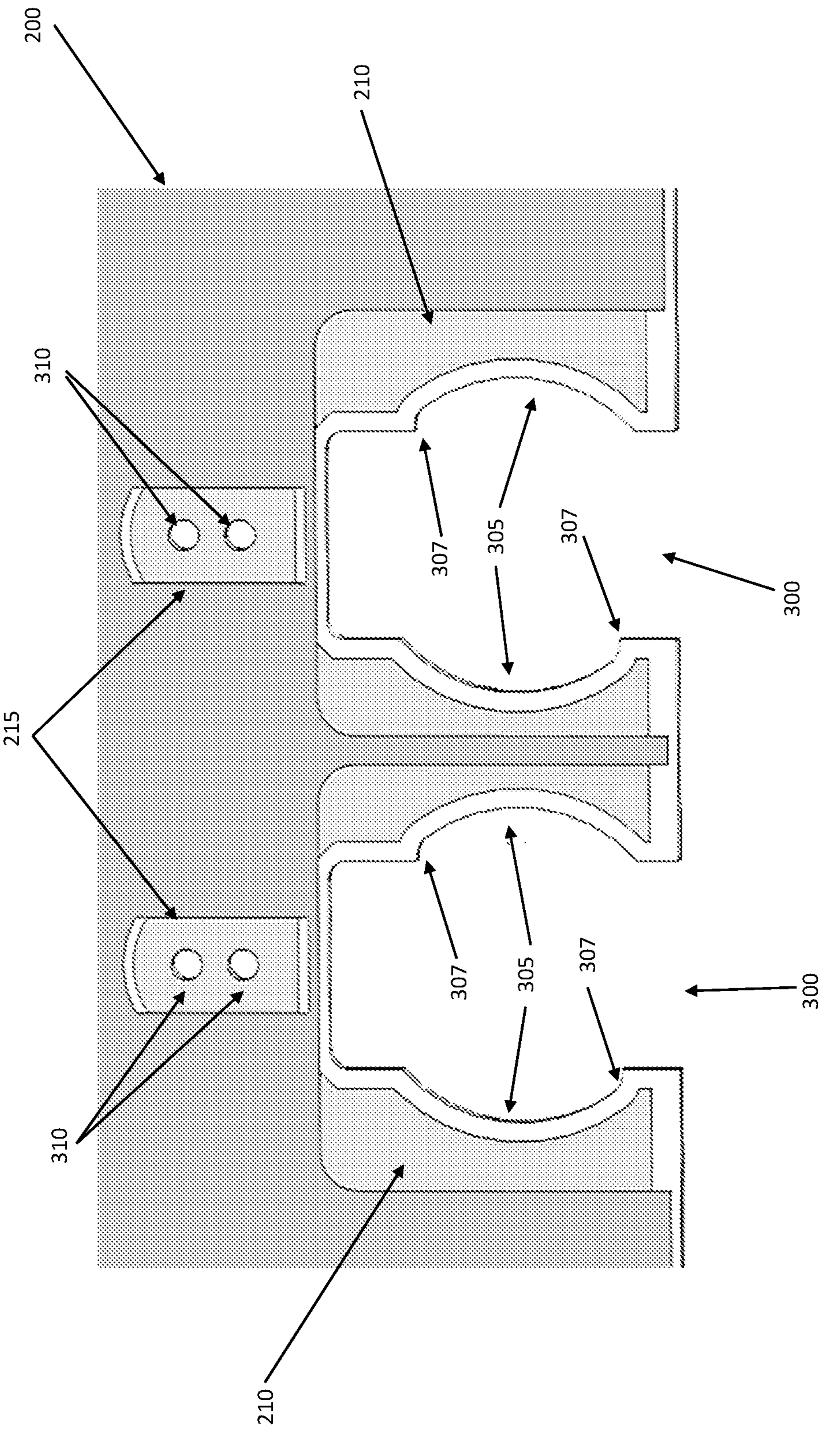
FIG. 3 illustrates the PCB of FIG. 2, showing two keyed slots, each of the keyed slots having a circular region and two stop ledges according to aspects of the disclosure.

FIG. 3 illustrates an exemplary PCB 200, which includes two keyed slots 300 such that each keyed slot 300 has a corresponding ground pad 210 disposed on the PCB 200, and a corresponding RF signal solder point 215. Each keyed slot 300 has a rectangular region 310 and a circular region 305 superimposed over the rectangular region 310. According to this exemplary embodiment, each keyed slot 300 includes two stop ledges 307, disposed at an intersection of the rectangular region 310 and the circular region 305. Each RF signal solder point 215 has two plated vias 320 that are configured to conduct the RF signals from an inner conductor of an installed RF cable (not shown) to signal traces disposed on an opposite side of the PCB 200.

The stop ledges 307 of each keyed slot 300 make it easier to align an transition clip 205 within the keyed slot 300, but it should be noted that stop ledges 307 are optional. Otherwise, a transition clip 205 without stop ledges 307 will be aligned properly once the RF cable is installed, as is described below with reference to FIGS. 6 and 7. If stop ledges 307 are not provided, then the transition clip 205 may be rotated a quarter turn in either planar direction (i.e., clockwise or counterclockwise) for securement.

Figure 4:
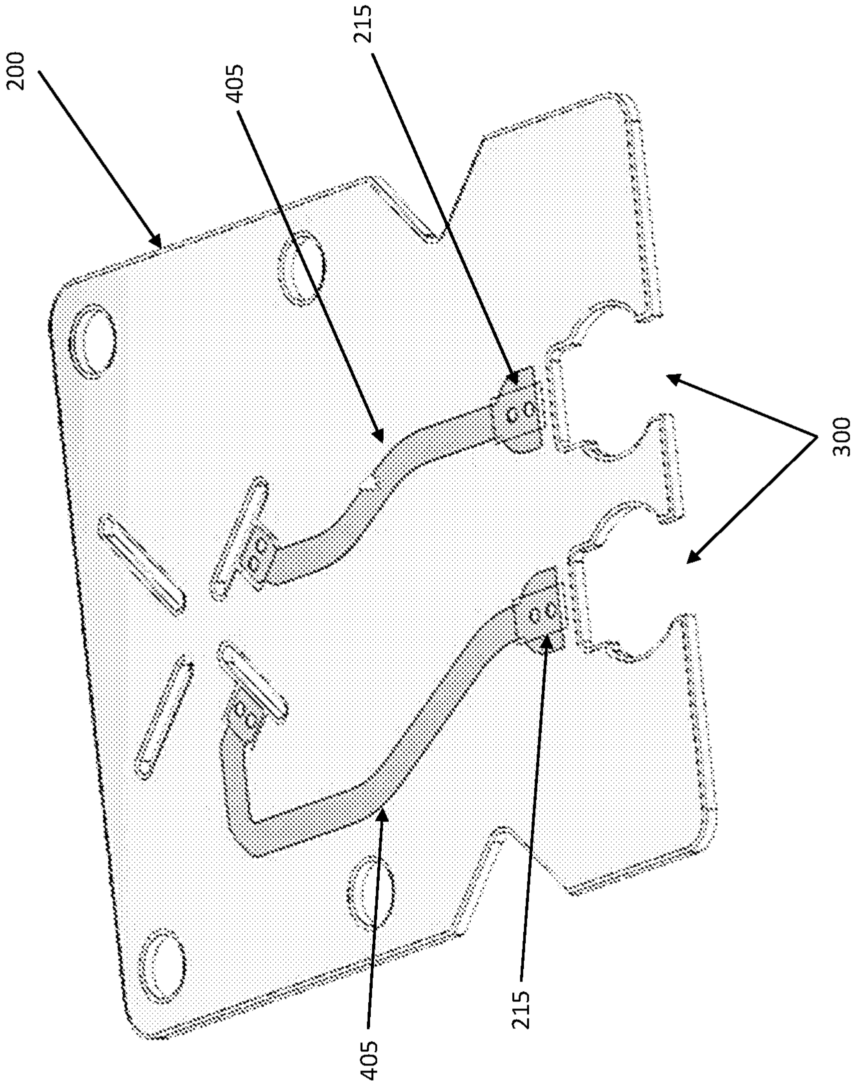
FIG. 4 illustrates the PCB of FIG. 3 from the other side, showing the solder point and signal trace for the RF signal from the center conductor of the RF cable.
Figure 5A:
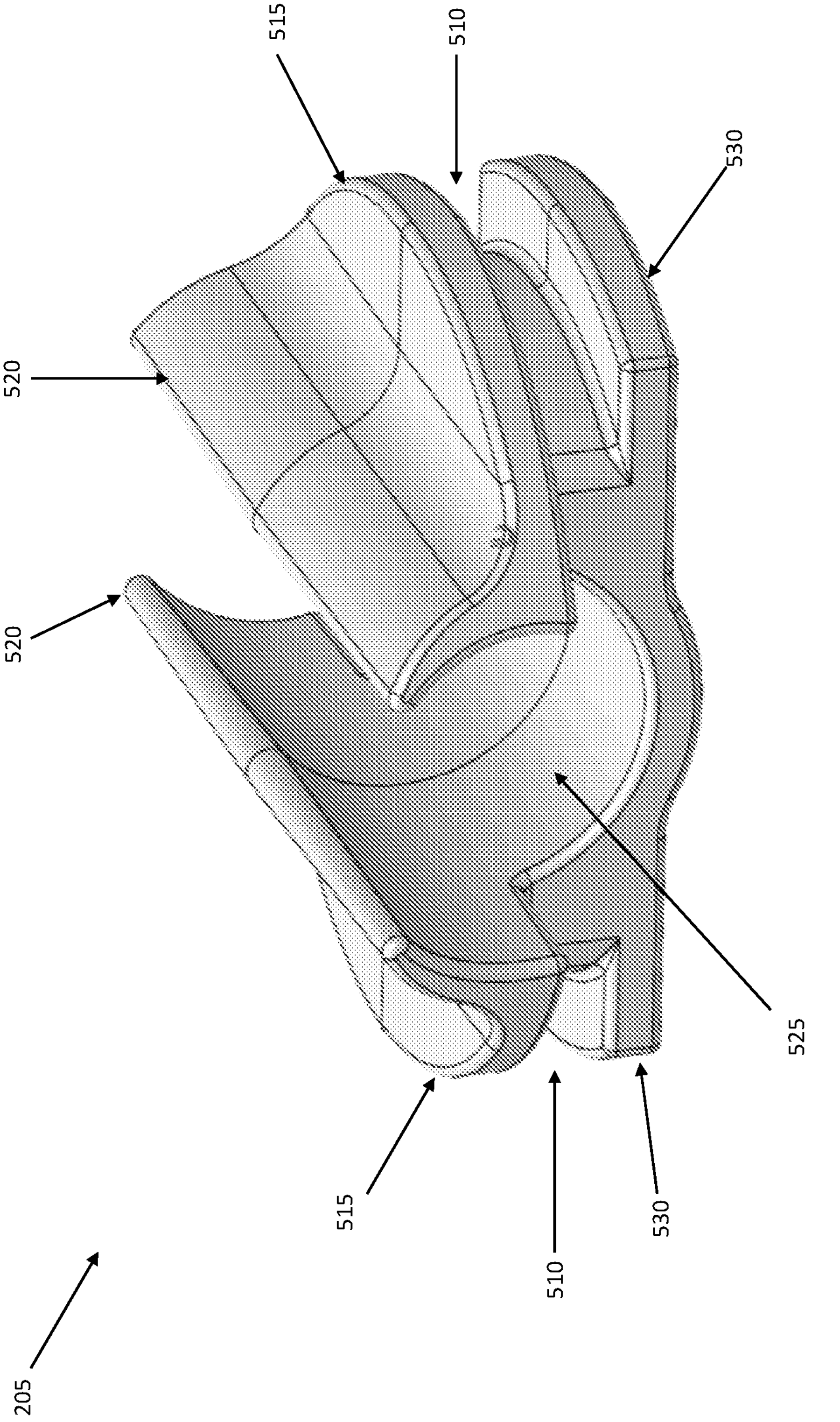
FIGS. 5A-5E provide various views of an exemplary transition clip from different angles.
Figure 5C:
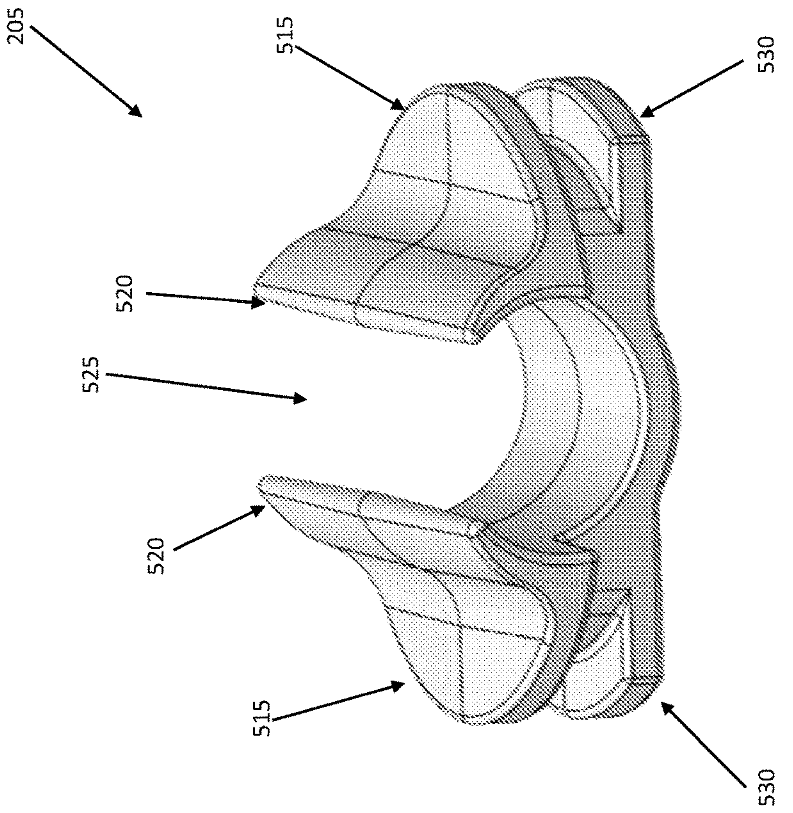
Figure 5B:
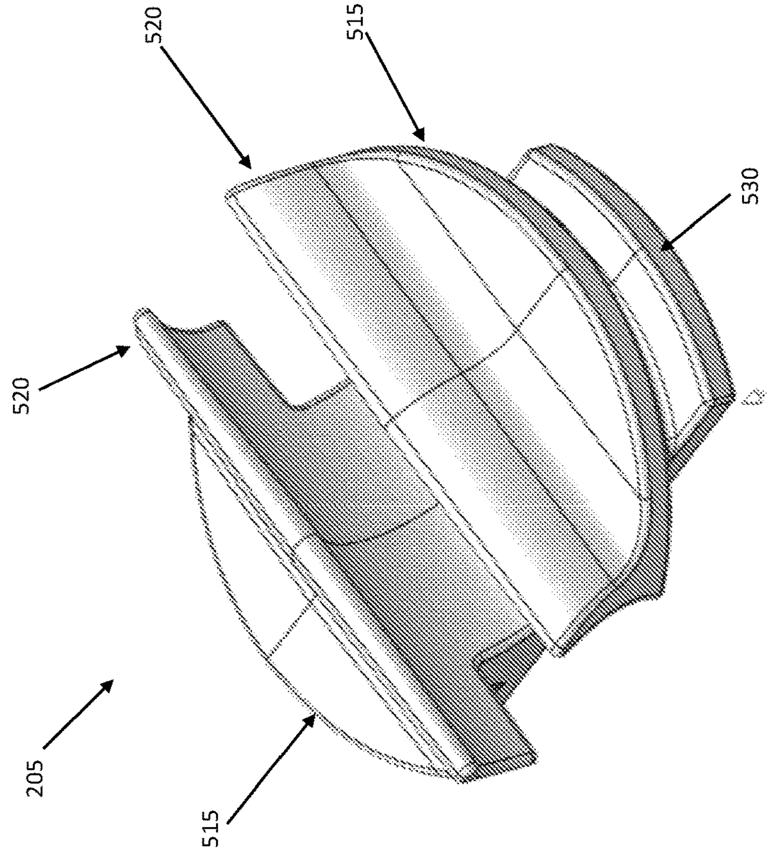
Figure 5D:
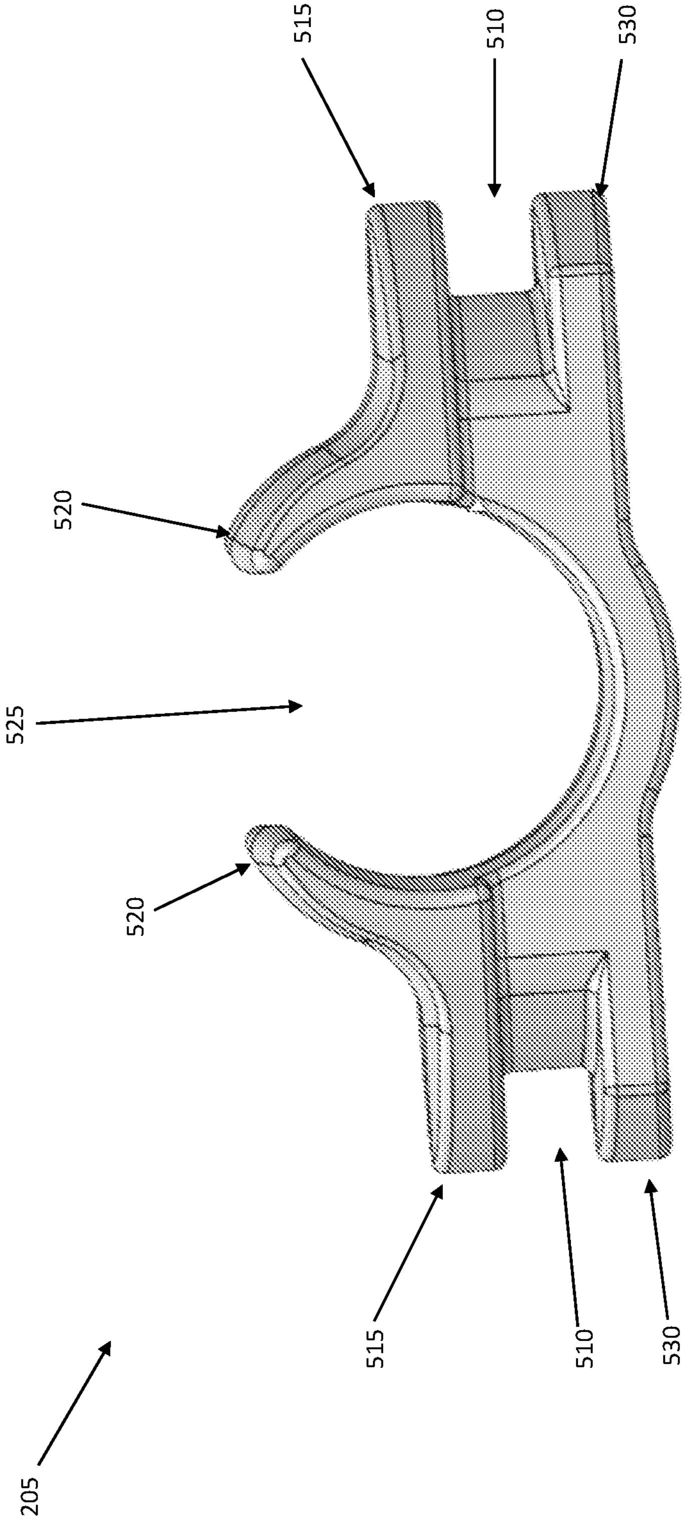
Figure 5E:
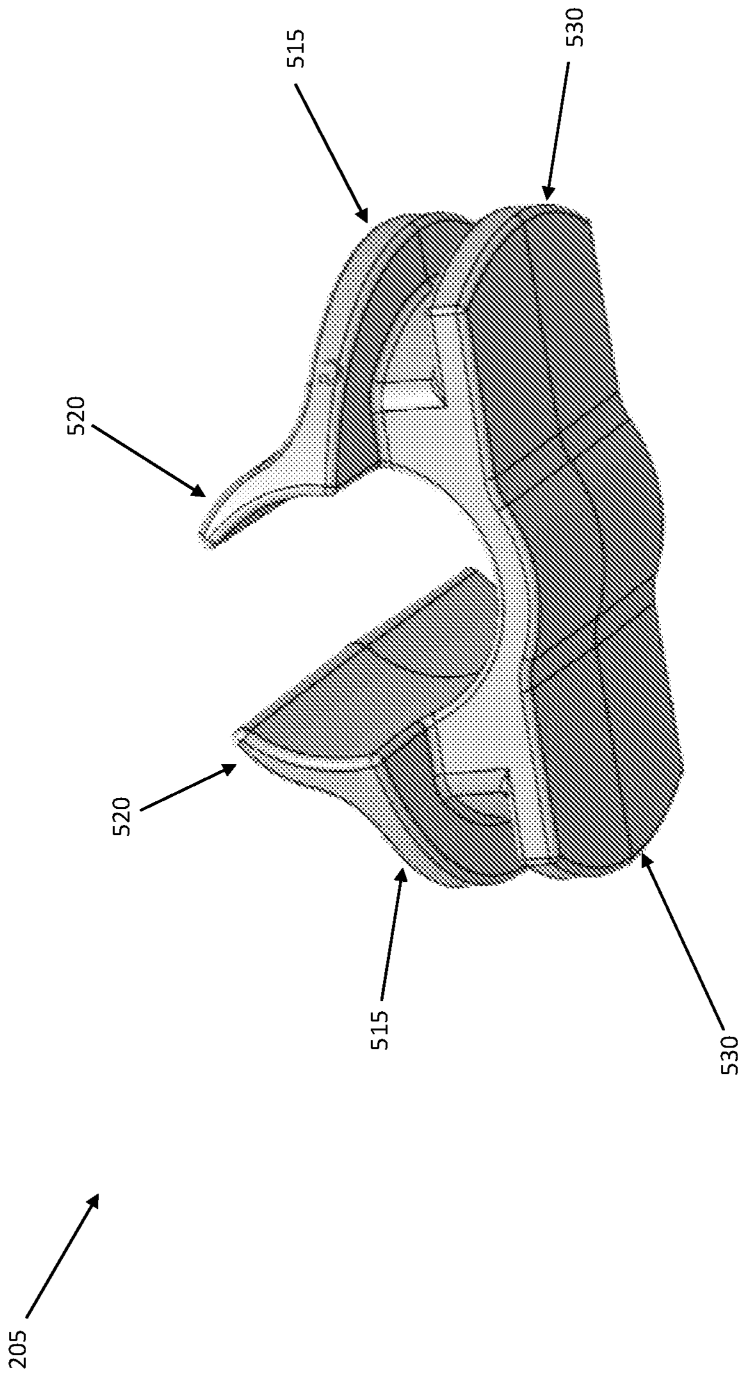

FIG. 4 illustrates the PCB 200 from the other side, showing the plated vias 320 that form an electrically conductive path from the RF signal solder point 215, through the PCB 300, and to signal traces 405 for coupling to each of the two radiators of a dipole 110, FIG. 1A.

FIGS. 5A-5E provide views of an exemplary transition clip 205 taken from different angles. According to at least one embodiment, the transition clip 205 may be formed of single piece of material that readily adheres to tin-based solder (e.g., copper, copper allows like brass, or zinc) so that the transition clip 205 can provide electrical coupling between the outer conductor of an RF cable and a ground pad 210. The transition clip 205 according to this embodiment includes a circular upper tab 515 and a lower tab 530 with a PCB slot 510 being disposed between the upper tab 515 and lower tab 530. The lower tab 530 is defined with a rectangular shape that enables the transition clip 205 to be inserted into the keyed slot 300 in which the circular upper tab 515 makes mechanical and electrical contact with the ground pad 210. The structure that defines the inner surface of the PCB slot 510 has a curvature that may match the curvature of the circular region 305 of the keyed slot 300. The circular shape of the inner surface of PCB slot 510 prevents the transition clip 205 from sliding out from the keyed slot 300 once the transition clip 205 has been inserted and then rotated a quarter turn, as is described below. Integrated with the circular upper clip 515 are two cable retainer walls 520, which define a clip aperture 525 into which a prepared RF cable with its outer jacket removed may be inserted to cause mechanical and electrical coupling between the RF cable outer conductor and the transition clip 205.

In a variation, the circular upper tab 515 may have a shape other than circular, as long as the upper tab 515 provides sufficient contact with the ground pad 210 in order to provide a strong mechanical and electrical coupling. It will be understood that such variations are possible and within the scope of the disclosure.

Figure 6:
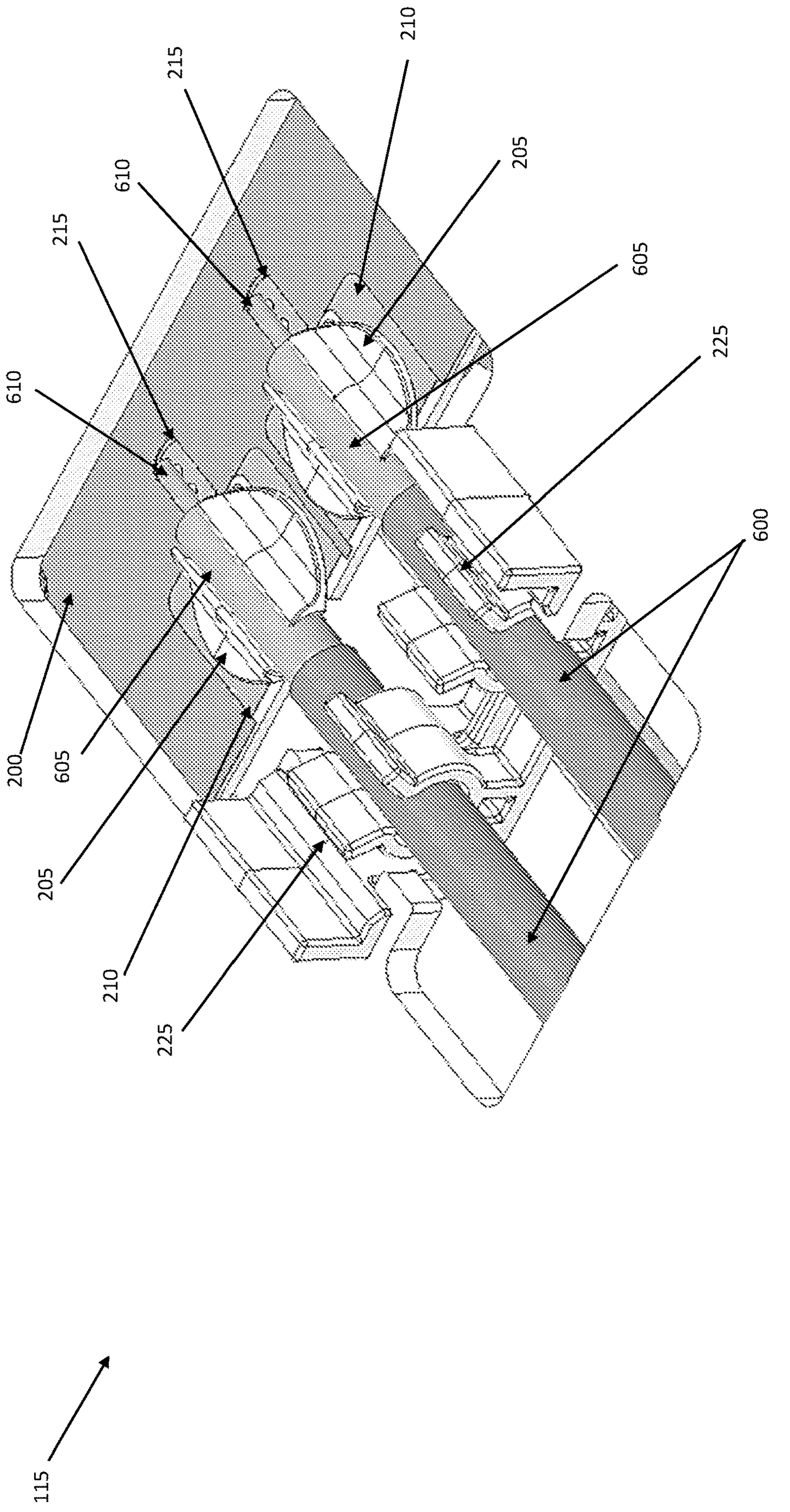
FIG. 6 illustrates the PCB of FIG. 4, with RF cables installed.

FIG. 6 illustrates a connection point 115 formed in the reflector plate 105, revealing the PCB 200 as well as two (2) transition clips 205 with two RF cables 600 installed. FIG. 6 illustrates an installation before solder is applied. As illustrated, each RF cable 600 is mechanically coupled to a cable retention clip 225, which engages the outer jacket of the RF cable 600. RF cables 600 are prepared in that their outer jackets are removed to expose their respective outer conductors 605, each of which are mechanically and electrically coupled to respective transition clips 205 by having been inserted into respective clip apertures 525. Further to the preparation of the RF cable 600, the outer conductor and insulator have each been removed from the cable end in a manner that is sufficient to expose the inner conductor 610, which is disposed above the RF signal solder point 215. Once solder has been applied, each inner conductor 610 is electrically and mechanically coupled to its corresponding RF signal solder point 215, the outer conductor 605 is mechanically and electrically coupled to its corresponding transition clip 205, and each transition clip 205 is electrically and mechanically coupled to its corresponding ground solder pad 210.

Figure 7:
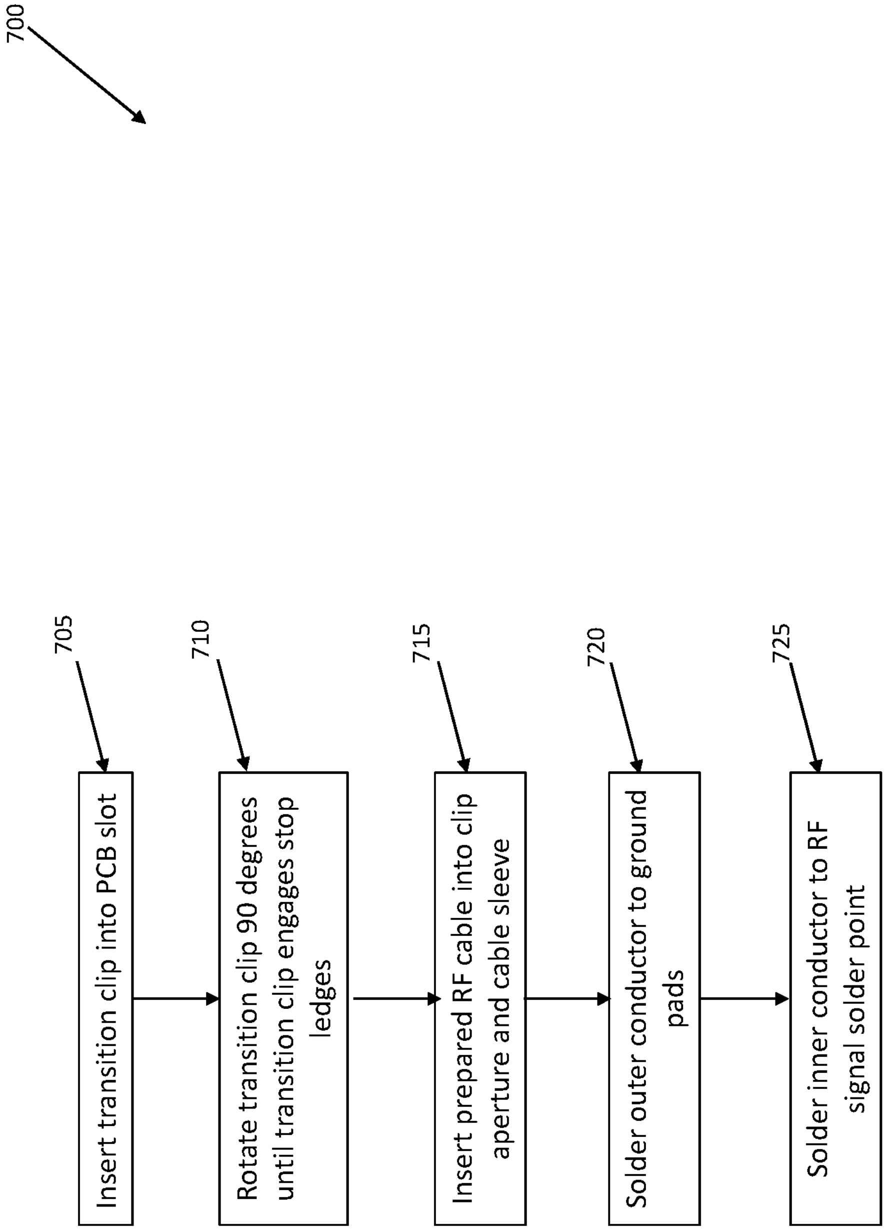
FIG. 7 illustrates an exemplary process for installing an RF cable onto a PCB using the PCB and transition clip, according to aspects of the disclosure.

FIG. 7 illustrates an exemplary process 700 for installing an RF cable 600 to a connection point 115 using the previously described PCB 200 and transition clip(s) 205 according to aspects of the disclosure.

Initially and in step 705, a technician or robot installs a transition clip 205 into slot 300 of a PCB 200. In doing so, the transition clip 205 is inserted at an orientation in which the longitudinal axis of the clip aperture 525 is orthogonal to the direction at which the RF cable 600 will be inserted. This is the orientation at which, based on the geometry of the lower tab 530 and the slot 510, transition clip 205 may be inserted into the slot 300 to where the lower surface of the circular upper tab 515 mechanically contacts the ground solder pad 210, and the inner surface of PCB slot 510 is coplanar with the PCB 200.

In step 710, the technician or robot rotates the transition clip 90 degrees (i.e., a quarter turn) in a counterclockwise direction according to this embodiment until the transition clip 205 mechanically engages the two stop ledges 307. As a result of step 710, the transition clip 205 is mechanically engaged with the PCB 200 and is stably disposed within the keyed slot 300. The circular shape of the inner structure of the PCB slot 510, which matches the curvature of circular region 305, prevents the transition clip 205 from sliding out of the keyed slot 300. An advantage of this connection is that it is not necessary to solder each transition clip 205 to the ground solder pad 210, as would be typically required under conventional technologies.

In step 715, the technician or robot will have inserted a prepared RF cable 600 into cable retention clip 225 and the clip aperture 525 of the transition clip 205. This insertion is done so that an exposed portion of the outer conductor 605 is in direct electrical and mechanical contact with the clip aperture 525 of the transition clip 205. At this point, having the RF cable 600 inserted into the transition clip 205 prevents the transition clip from rotating, which would undo its prior quarter turn insertion and resulting with the transition clip 205 falling out of the keyed slot 300. The presence of the RF cable 600 prevents that undesirable rotation of the transition clip 205 from occurring.

In step 720, the technician or robot solders the outer conductor 605 of the RF cable 600 to the transition clip 205, and the transition clip 205 to the ground solder pad 210 of PCB 200, respectively. This connection may be done in a single action.

In step 725, the technician or robot solders the inner conductor 610 of RF cable 600 to the RF signal solder point 215. This soldering is done in such a way that the connection between the inner conductor 610 and the RF signal solder point 215 is isolated from the connection between the outer conductor 605, the transition clip 205, and the ground solder pad 210.

Steps 720 and 725 are performed from a single side of the reflector plate 105, thereby simplifying the soldering process and enabling automation. In automation, wave form soldering may be employed.

While the invention has been described in terms of particular variations and illustrative figures, those of ordinary skill in the art will recognize that the invention is not limited to the variations or figures described. In addition, where methods and steps described above indicate certain events occurring in certain order, those of ordinary skill in the art will recognize that the ordering of certain steps may be modified and that such modifications are in accordance with the variations of the invention. Additionally, certain of the steps may be performed concurrently in a parallel process when possible, as well as performed sequentially as described above. Therefore, to the extent there are variations of the invention, which are within the spirit of the disclosure or equivalent to the inventions found in the claims, it is the intent that this patent will cover those variations as well.

To the extent that the claims recite the phrase "at least one of" in reference to a plurality of elements, this is intended to mean at least one or more of the listed elements, and is not limited to at least one of each element. For example, "at least one of an element A, element B, and element C," is intended to indicate element A alone, or element B alone, or element C alone, or any combination thereof "At least one of element A, element B, and element C" is not intended to be limited to at least one of an element A, at least one of an element B, and at least one of an element C.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The terminology used herein is for the purpose of describing particular embodiments only and is not intended to be limiting. As used herein, the singular forms "a," "an," and "the" are intended to include the plural forms as well, unless the context clearly indicates otherwise. It will be further understood that the terms "comprise" (and any form of comprise, such as "comprises" and "comprising"), "have" (and any form of have, such as "has" and "having"), "include" (and any form of include, such as "includes" and "including"), and "contain" (and any form of contain, such as "contains" and "containing") are open-ended linking verbs. As a result, a method or device that "comprises," "has," "includes," or "contains" one or more steps or elements possesses those one or more steps or elements, but is not limited to possessing only those one or more steps or elements. Likewise, a step of a method or an element of a device that "comprises," "has," "includes," or "contains" one or more features possesses those one or more features, but is not limited to possessing only those one or more features. Furthermore, a device or structure that is configured in a certain way is configured in at least that way, but may also be configured in ways that are not listed.

The corresponding structures, materials, acts, and equivalents of all means or step plus function elements in the claims below, if any, are intended to include any structure, material, or act for performing the function in combination with other claimed elements as specifically claimed. The description set forth herein has been presented for purposes of illustration and description, but is not intended to be exhaustive or limited to the form disclosed. Many modifications and variations will be apparent to those of ordinary skill in the art without departing from the scope and spirit of the disclosure. The embodiment was chosen and described in order to best explain the principles of one or more aspects set forth herein and the practical application, and to enable others of ordinary skill in the art to understand one or more aspects as described herein for various embodiments with various modifications as are suited to the particular use contemplated and in accordance with the following appended claims.

What is claimed is:

1. An antenna, comprising:

a PCB (Printed Circuit Board) having a plurality of keyed slots, each of the keyed slots having a rectangular area and a circular area superimposed over the rectangular area;

a plurality of transition clips, each of the transition clips being disposed within a corresponding keyed slot, wherein each transition clip includes an upper tab, a lower tab, a PCB slot disposed between the upper tab and the lower tab, and two cable retainer walls that define a clip aperture; and a plurality of RF cables, each of the plurality of RF cables being mechanically coupled to a corresponding transition clip, wherein each RF cable includes an exposed outer conductor that is mechanically and electrically coupled to a corresponding clip aperture by a first solder joint, and an inner conductor that is electrically and mechanically coupled to an RF signal solder point on the PCB by a second solder joint, and wherein the first solder and the second solder joint are disposed on a same side of the PCB, and in which each transition clip is secured to the PCB by initially advancing the transition clip within the corresponding keyed slot such that a longitudinal axis of the clip aperture is orthogonal to a longitudinal axis of the plurality of RF cables and then rotating the transition clip approximately 90 degrees within the keyed slot.

2. The antenna of claim 1, wherein each of the keyed slots further comprises one or more stop ledges disposed between the circular area and the rectangular area and in which the transition clip is stopped from further rotation in the keyed slot when the transition clip engages the one or more stop ledges.

3. The antenna of claim 1, wherein the upper tab comprises a circular shape.

4. The antenna of claim 1, wherein each transition clip is mechanically and electrically coupled to a ground solder pad by the first solder joint.

5. The antenna of claim 1, wherein each transition clip is mechanically and electrically coupled to a ground solder pad by a third solder joint, wherein the third solder joint is disposed on the same side of the PCB.

6. The antenna of claim 1, further comprising a plurality of cable retention clips, each of the cable retention clips mechanically coupled to an outer jacket of a corresponding RF cable.

7. The antenna of claim 1, wherein the lower tab has a shape that enables it to be inserted through the keyed slot.

8. A method for installing an RF (Radio Frequency) cable onto a PCB (Printed Circuit Board) within an antenna, the method comprising:

inserting a transition clip into a keyed slot disposed on the PCB, the PCB having a ground solder pad and an RF signal solder point, wherein the transition clip comprises an upper tab, a lower tab, and a PCB slot disposed between the upper tab and lower tab;

rotating the inserted transition clip so that the transition clip mechanically couples with the keyed slot and remains fixed within the keyed slot, the transition clip having a clip aperture;

inserting a prepared RF cable into the clip aperture such that an exposed outer conductor of the RF cable is mechanically and electrically coupled to the clip aperture;

soldering the exposed outer conductor to the transition clip;

soldering the transition clip to the ground solder pad; and soldering an inner conductor of the RF cable to the RF signal solder point and in which the transition clip is initially inserted into the keyed slot prior to rotating the transition clip such that a longitudinal axis of the clip aperture is orthogonal to a longitudinal axis of the RF cable.

9. The method of claim 8, wherein the rotating the transition clip comprises turning the transition clip a quarter turn or until the transition clip engages one or more stop ledges within the keyed slot, wherein each keyed slot has a rectangular area and a circular area superimposed over the rectangular area, the one or more stop ledges being disposed between the rectangular area and the circular area.

10. The method of claim 8, wherein the steps of soldering the exposed outer conductor, soldering the transition clip to the ground solder pad, and soldering an inner conductor of the RF cable to the RF signal solder point are each performed from the same side of the PCB.

11. The method of claim 8, wherein the steps of soldering the exposed outer conductor and soldering the transition clip to the ground solder pad are performed in a single soldering step.

* * * * *